April 25, 1950 P. W. KRIDLER 2,505,052
LURE
Filed Feb. 14, 1945 4 Sheets-Sheet 1
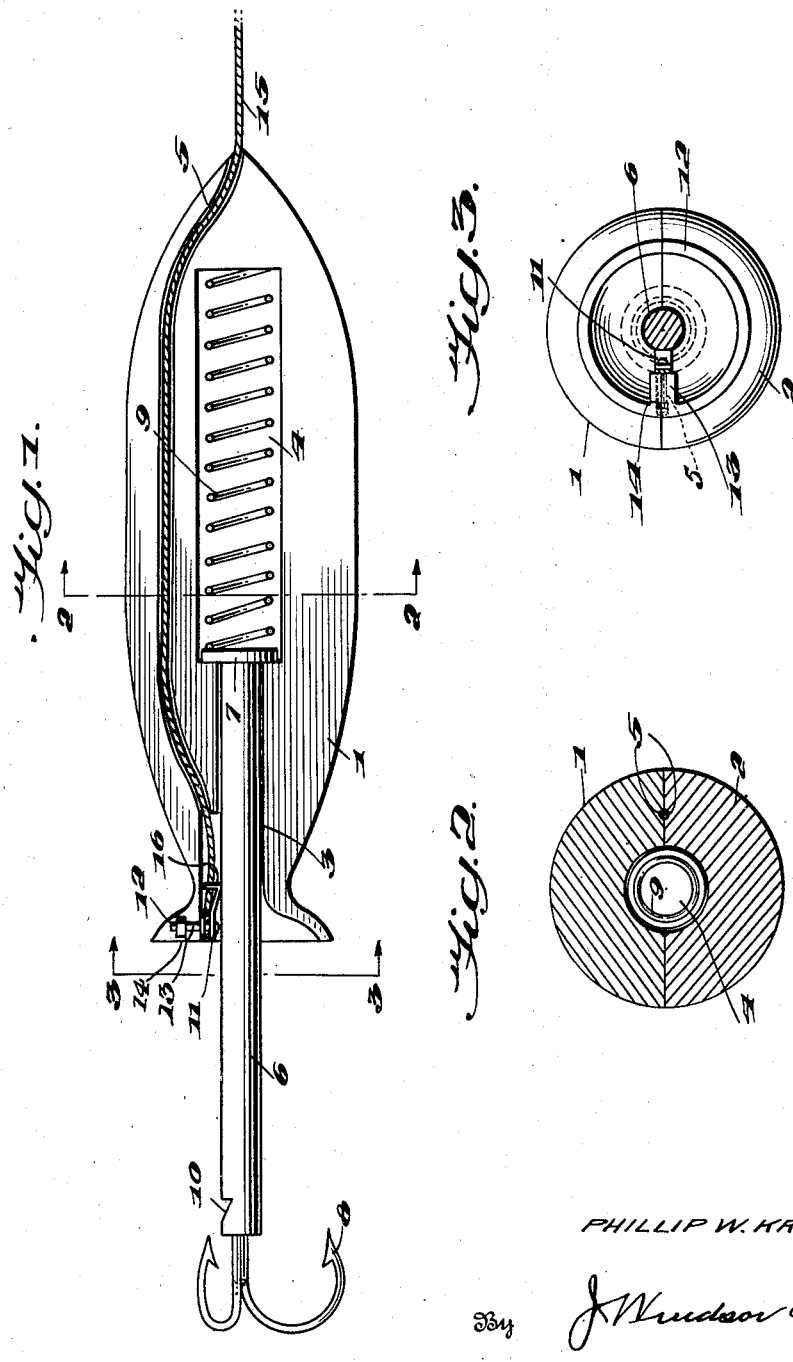
Inventor
PHILLIP W. KRIDLER,
By J. Windsor Davis
Attorney April 25, 1950 P. W. KRIDLER 2,505,052
LURE
Filed Feb. 14, 1945 4 Sheets-Sheet 2
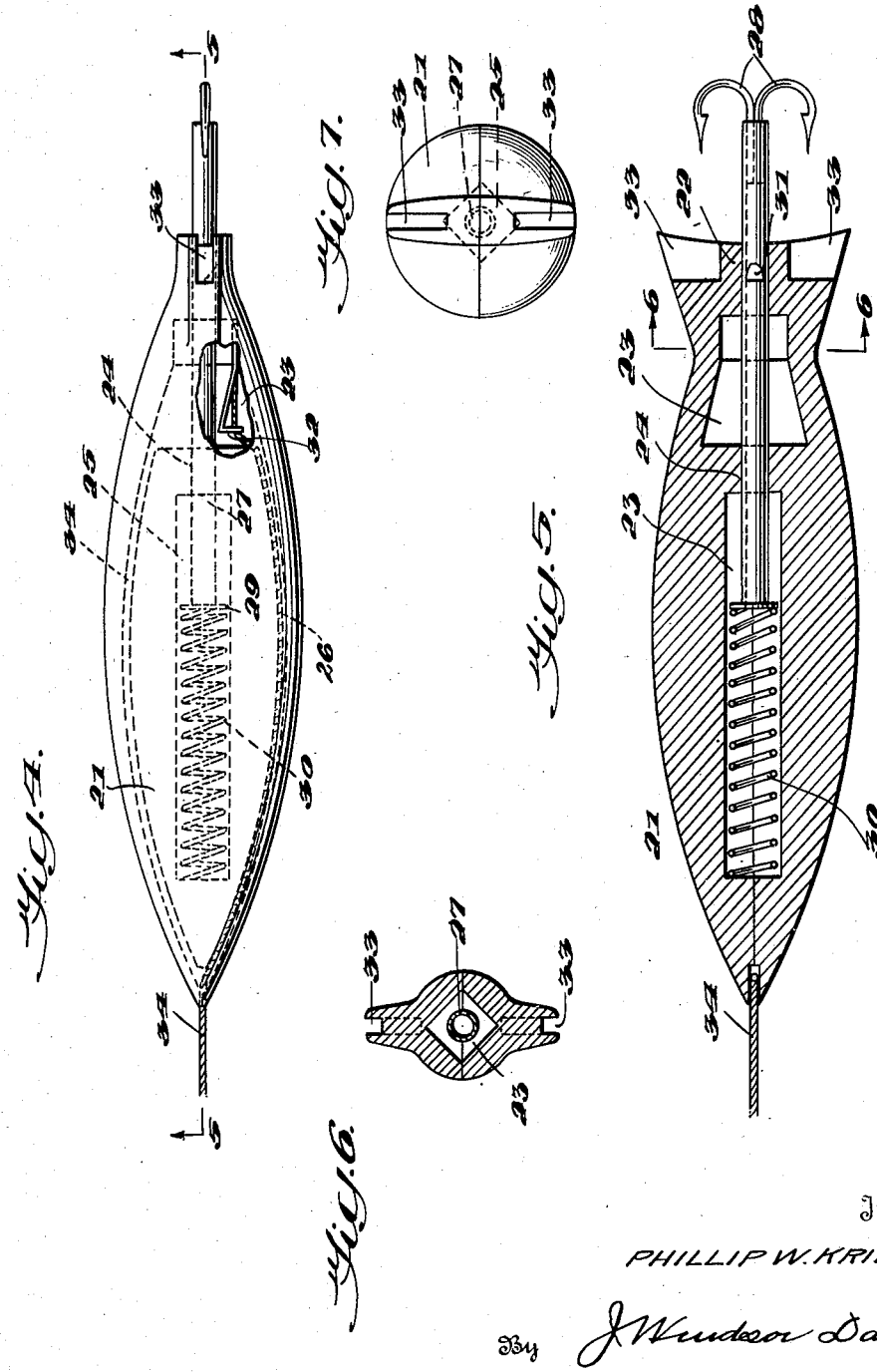
Inventor
PHILLIP W. KRIDLER,
By J. Windsor Davis
Attorney

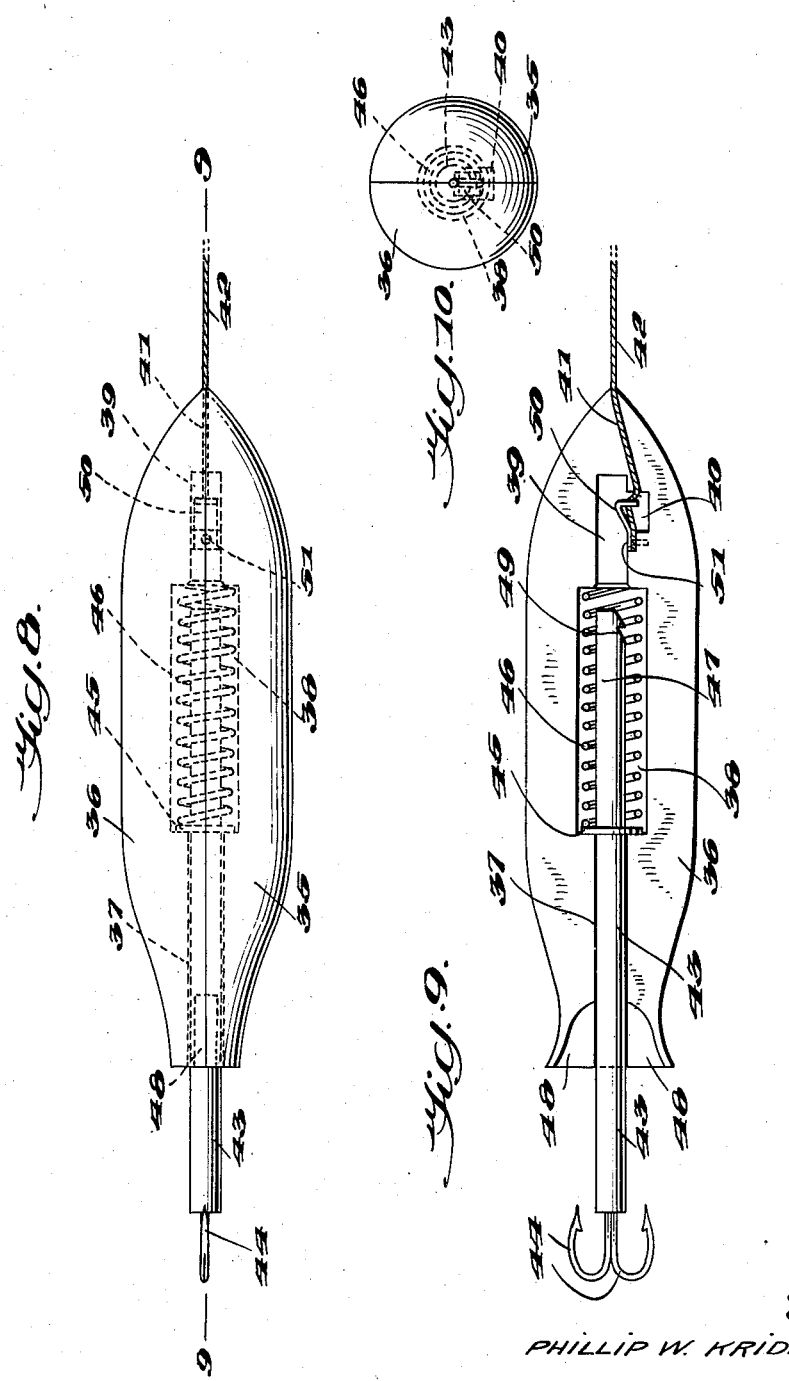

April 25, 1950  P. W. KRIDLER  2,505,052
LURE

Filed Feb. 14, 1945  4 Sheets-Sheet 4

INVENTOR.
PHILIP W. KRIDLER,
BY
ATTORNEY

Patented Apr. 25, 1950

2,505,052

UNITED STATES PATENT OFFICE 2,505,052

LURE

Philip W. Kridler, Detroit, Mich.

Application February 14, 1945, Serial No. 577,776

9 Claims. (Cl. 43—35)

This invention relates to fish lures and has for its object to provide a lure with retractable and extensible hooks and having a body portion shaped in general simulation of a minnow and which can be pulled through water without attaching itself to weeds. The principal objects of the invention are to provide a lure body which can, suitably and preferably, be made of any one of several commercial plastics, to provide a complete lure of simplified construction composed of a minimum number of parts, and to provide a lure which will be very economical to manufacture, reliable in action and of increased life.

Another object is to provide a lure made of a suitable plastic which can be molded in halves and the halves connected together. The lower half may be made of one suitable color, such as white, while the upper half may be made of another suitable color such as green.

A further object is to provide a lure body composed of two halves which may be made from the same mold thus simplifying the manufacture thereof.

Another object is to provide an improved hook release having a channel for a leader molded in the body, the release being well protected against the entry of extraneous matter thereto and located either towards the front or towards the rear end of the body.

A further object is to provide a lure with a hook release visible externally and rearwardly of the lure body so that it may be adjusted or cleaned or replaced, if need be.

Figure 11:
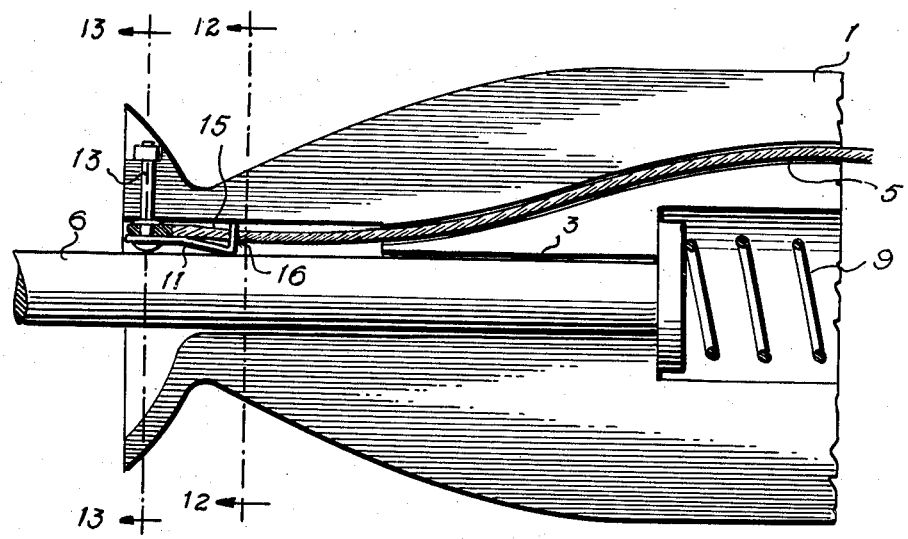
Figure 12:
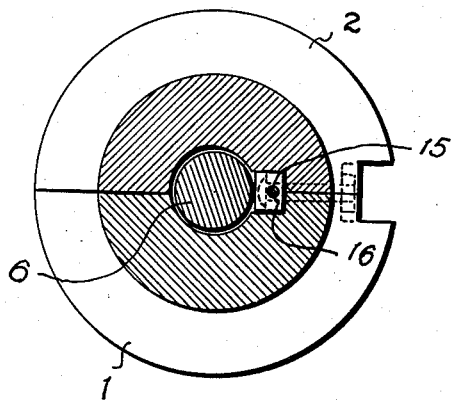
Figure 13:
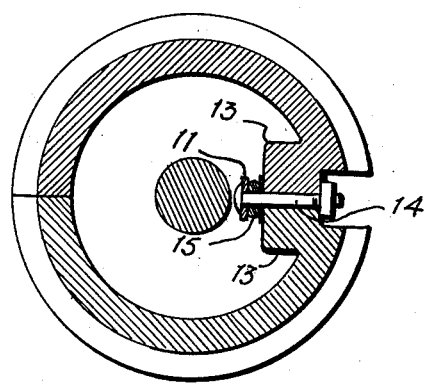

Other objects and advantages will become hereinafter more fully apparent as reference is had to the accompanying drawings in which my invention is illustrated and in which:

Figure 1 is a side elevation of my improved lure with one of the plastic body halves removed, Figure 2 is a diametric section taken along the line 2—2 of Figure 1, Figure 3 is a diametric section taken along the line 3—3 of Figure 1 showing a rear view of the lure body, Figure 4 is a side elevation of a modified form of my invention, Figure 5 is a longitudinal diametric section along the line 5—5 of Figure 4, Figure 6 is a transverse diametric section taken along the line 6—6 of Figure 5, Figure 7 is a rear elevation of the showing of Figure 4, Figure 8 is a side elevation of another modified form of the invention showing a hook release located toward the front end of the lure body, Figure 9 is a transverse longitudinal section taken along the line 9—9 of Figure 8 in which one body half is shown in elevation, Figure 10 is a front elevation of the lure of Figures 8 and 9, and Figure 11 is an enlarged detail section of the rear or left portion of Figure 1, Figure 12 is a transverse section taken along the line 12—12 of Figure 11, and Figure 13 is a transverse section taken along the line 13—13 of Figure 11.

More particularly, I provide a lure body composed of two half body portions 1 and 2, which may be cast from the same mold. These portions are each made of some suitable plastic such as a cellulose compound, styrene or any other special or commercial plastic material. They are each preferably solid except for a relatively small semi-cylindrical bore 3 axially of each thereof which leads to a larger semi-cylindrical bore 4 in each case, and a much smaller half channel 5 of semi-circular shape in any transverse cross section.

When the two body halves 1 and 2 are assembled, preferably by cementing, the composite bore 3 houses a plunger 6 which is slidable therein. The plunger 6 terminates at one end in an enlarged head 7 which limits its movement in projecting position, and at its other end it carries a plurality of fish hooks 8, preferably two or three in number. The composite bore formed by the two half bores 4 houses a compression spring 9, one end of which seats on the head 7 of the plunger 6 thus urging the plunger with its hooks toward extended or projected position. A manual push against the hooks 8 in the direction of the composite body 1, 2 forces the plunger 6 into the body against the compression of the spring 9 where it is held by a latch consisting of a notch 10 near the outer end of the plunger 6 and a spring detent 11 carried by the body 1, 2.

As best seen in Figures 11 and 13, each body half has half a shoulder 13 upon which the detent 11 is mounted and to which it is secured by a small bolt or screw 14. The detent is thus visible from the rear end of the body for inspection or for cleaning and the little bolt or screw is removable to permit repair or replacement of the detent.

The screw 14 is set to the rear end of the detent and also anchors the lure leader 15 which threads through an opening 16 (see Figures 11 and 12) in the front end of the detent 11 from whence it passes through the composite passageway 5 and outwardly for attachment to a fish line. A sudden pull or jerk on the leader 13 elevates the point of the detent from the notch 10 and releases the plunger 6 whereupon the spring 9 pushes the plunger with its hooks 8 to the projected position illustrated in Figure 1.

Figures 4 to 7 inclusive show a modified form of my improved lure. The body halves 20 and 21 are of identical construction and hence can be made from the same mold. When the halves are cemented together, a cylindrical bore 22 extends axially thereof from the rear toward the front, terminating in an enlarged portion or chamber 23. A bore 24 leads from the chamber 23 into a larger and longer cylindrical bore 25. Each body half has half a hollow passageway extending from its nose to the chamber 23 and which mates with the other to form the passageway 26.

A hollow plunger 27 is slidable axially of the bores 22, 24 and 25 and of the chamber 23. In the outer end of this plunger I mount a plurality of fish-hooks 28, preferably two in number. The inner end of this plunger carries an enlarged head 29 which limits the outward or projecting movement of the plunger. A spring 30 constantly urges the plunger 27 to projecting position. A notch 31 in the plunger 27 is adapted to engage a spring detent 32 which is secured at one end to a wall of the chamber 23 so that when the hooks 28 are sufficiently urged by the hand of an operator to force their ends into the recesses 33 of the body halves the detent 32 will engage the notch 31 and retain the plunger in retracted position. It is then ready to be cast into the water by means of the leader or line 34 which is secured to a body half near the anchorage of the detent thence passes through a hole in the detent and from there outwardly of the body by way of a passage 26.

Figures 8, 9 and 10 show a modification similar to the constructions of Figures 1 to 7 but having the release located near the front end of the body. In this form, the body is composed of two halves 35 and 36 each made of identical shape and from the same mold, but preferably of different colors. The body halves each have half cylindrical bores which, in assembly, form a bore 37 which extends from the rear of the body to an enlarged chamber or bore 38, the chamber 38 being open, in turn, to another chamber or bore 39 towards the front end of the body. Each body half also has a half recess 40 in the wall of its half of the chamber 39, as will be further described. Each body half also has half a small bore 41 leading from its front end into the recess 40 in order to slidably receive a leader 42 adapted to be attached to a fishing line.

A hook rod 43 having two hooks 44 on the outer end thereof is slidably mounted in the bore 37 and extends through this bore into the chamber 38 where it has an enlarged head 45 which stops its outward travel. A compression spring 46 is housed in the bore 38 and seats on the head 45 at one end, its other end encompassing the end of the chamber 39 and seating against the end of the chamber 38. An extension 47 of the rod 43 extends well into the chamber 38 and is notched near its outer end at 49.

The rod 43 is of such length that when it is in retracted position the hooks 44 will be nested in hook receiving recesses 48 and the notch 49 will engage a trigger 50. The trigger 50 is anchored jointly with the leader 42 in the chamber 39, by a screw 51. The leader extends through a hole in the front end of the trigger and then outwardly through the passageway 41.

It will be noted that the front end of the trigger is bent downwardly as viewed in Figure 9 and after the leader passes therethrough the leader bends downwardly for entrance into the passageway 41. A tug or jerk on the leader tends to straighten out the leader thus depressing the end of the trigger into the recess 40. The trigger thus releases from the notch 49 and the hook rod is projected to the extended position illustrated.

Various changes may be made without departing from the spirit of my invention and I therefore desire to be extended protection as defined by the appended claims.

What I claim is:

1. A fish lure for a fisherman comprising a lure body, a plunger retractable into and extensible from said body, said plunger having a plurality of fish hooks on the outer end thereof, a spring within said body urging said plunger to extended position, said plunger having one latch member carried thereby and said body having a mating latch member carried thereby, and a leader extending through said body and attached to said mating latch member, said leader being arranged to release the latch members from engagement by a sudden pull thereon by the fisherman whereby said plunger with its hooks is projected to extended position.

2. A fish lure for a fisherman comprising a lure body, a plunger retractable into and extensible from said body, said plunger having a plurality of fish hooks on the outer end thereof, a spring within said body urging said plunger to extended position, said plunger being notched along its length, a spring detent anchored in said body adapted to engage said notch when said plunger is moved to retracted position, and a leader anchored also in the anchorage of said detent and threaded through said detent and extending outwardly of the front end of said body, said leader elevating said detent from engagement with said notch by a jerk on said leader by the fisherman whereby said plunger with its hooks is projected to extended position.

3. A fish lure for a fisherman comprising a lure body, a plunger retractable into and extensible from said body, said plunger having a plurality of fish hooks on the outer end thereof, a spring within said body urging said plunger to extended position, said plunger being notched near its outer end, a spring detent secured by a threaded member to the rear end of said body and adapted to engage said notch when said plunger is in retracted position, and a leader anchored to said body and threaded through said detent in such manner that a sudden pull on said leader by the fisherman elevates said detent from engagement with said notch thereby releasing said plunger for movement to extended position by said spring, said detent being visible from the rear of said body and said threaded member being removable from without said body to permit removal of said detent for repair or replacement.

4. A fish lure for a fisherman comprising a body composed of two halves of an impervious plastic material cemented together, each of said halves having coaxial cylindrical half bores of different diameter, said halves when assembled forming a relatively small longitudinal bore adapted to receive a fish hook carrying a plunger having a head, and a relatively larger bore adapted to house the head of said plunger and a compression spring reacting against said head, said body halves also having mating channel halves which, when the body halves are assembled, form a channel for the reception of a leader freely movable longitudinally therein, said plunger having a notch formed therein, and a trigger anchored in said body halves and adapted to engage said notch when said plunger is in retracted position, said leader operatively engaging said trigger and acting as a trip for the release thereof from engagement by the fisherman with said notch as a result of a jerk thereon.

5. A fish lure for a fisherman comprising a body composed of two halves of an impervious plastic material cemented together, each of said halves having coaxial cylindrical half bores of different diameter, said halves when assembled forming a relatively small longitudinal bore adapted to receive a fish hook carrying plunger having a head, and a relatively larger bore adapted to house the head of said plunger and a compression spring reacting against said head, said body halves also having half channels of small bore extending rearwardly from the front end thereof, said plunger having a notch formed in the length thereof, a trigger anchored at one end in said longitudinal bore and adapted to engage said notch by a detent formed on the other end thereof when said plunger is in retracted position, said trigger having a hole therethrough above said detent said leader being anchored in the sidewall of said longitudinal bore jointly with said trigger and threaded through the hole in the front of said trigger, said leader when jerked by the fisherman elevating said detent from engagement with said notch thereby releasing said plunger.

6. A fish lure comprising a body composed of two halves of an impervious plastic material cemented together, each of said halves having coaxial cylindrical half bores of different diameter, said halves when assembled forming a relatively small longitudinal bore adapted to receive a fish hook carrying plunger having a head and a relatively larger bore adapted to house the head of said plunger and a compression spring reacting against said head, said plunger having a co-axial extension arising from said head and, when in retracted position, extending through said compression spring and into a reduced portion of said bore, said extension having a notch near the outer end thereof, a trigger anchored at one end in said reduced portion and having a hole therethrough near its other end, said body halves also having mating channel halves of small bore extending from the front end thereof rearwardly toward said reduced portion, and a leader in the channel formed by said body halves when assembled being anchored jointly with said trigger and threaded through a hole in the free end of said trigger, said leader being normally bent from said hole to its entry into said channel, said leader when jerked tending to straighten out thereby elevating said trigger from said notch to release said plunger for movement to extended position by said spring.

7. A fish lure comprising a body composed of two halves of an impervious plastic material, each of said halves having aligned cylindrical half bores of different diameter, said halves when assembled forming a relatively small longitudinal bore and a coaxial larger bore open to the smaller bore, a plunger having fish hooks on the outer end thereof slidably mounted in said smaller bore and having a head permanently in said larger bore, a compression spring in said larger bore having one end resting on said head yieldingly to oppose retracting movement of said plunger into said bores, said body halves also each having channel halves extending from the nose thereof to a point rearwardly of said larger bore, said halves when assembled mating the channel halves to form a channel for a leader, and a spring detent at the rear end of said channel, said plunger being notched near its outer end for engagement by said detent when said plunger is in retracted position, said leader extending through said channel and into operative engagement with said detent.

8. A fish lure comprising a body composed of two halves of an impervious plastic material, each of said halves having aligned cylindrical half bores of different diameter, said halves when assembled forming a relatively small longitudinal bore and a coaxial larger bore open to the smaller bore, a plunger having fish hooks on the outer end thereof slidably mounted in said smaller bore and having a head permanently in said larger bore, a compression spring in said larger bore having one end resting on said head yieldingly to oppose retracting movement of said plunger into said bores, said body halves also each having channel halves extending substantially the entire length thereof, said halves when assembled forming a channel for a leader, one of said channel halves having an integral shoulder at the rear end thereof and adjacent the end of said channel, a spring detent having a hole therein anchored to said shoulder and visible for inspection rearwardly of said halves, and a leader anchored at the anchorage of said detent and threaded through the hole in the front end of said detent and extending through said channel and out the front end of said body, said plunger being notched near the outer end thereof for engagement with said detent whereby said plunger is maintained in retracted position, said detent being elevated out of engagement with said notch by a sudden pull on said leader whereby said plunger moves to extended position.

9. A fish lure comprising a lure body having identical halves of an impervious plastic material united together, said body having a large cylindrical bore axially thereof, a chamber spaced from said bore, and relatively smaller coaxial cylindrical bores, one of which connects said chamber outwardly of said body at the rear thereof, a plunger extending through, and slidable in, said smaller bores, through said chamber, and into said large bore, a spring in said large bore urging said plunger to projected position, a latch means in said chamber adapted to hold said plunger in retracted position against the compression of said spring, and a leader operatively connected to said latch means and extending outwardly through said body for attachment to a fishing line, said latch means releasing said plunger in response to a tug on said leader, said plunger having a plurality of fish hooks on its outer end.

PHILIP W. KRIDLER.

(References on following page)

REFERENCES CITED

The following references are of record in the file of this patent:

UNITED STATES PATENTS

| Number | Name | Date |
|---|---|---|
| 784,747 | Lobit | Mar. 14, 1905 |
| 1,009,538 | Lowe | Nov. 21, 1911 |
| 1,324,829 | Kornis | Dec. 16, 1919 |
| 1,727,812 | David | Sept. 10, 1929 |
| 1,791,084 | Pike | Feb. 3, 1931 |
| 2,270,487 | Withey | Jan. 20, 1942 |
| 2,374,829 | Johnson | May 1, 1945 |